United States Patent [19]

Shimizu et al.

[11] Patent Number: 4,970,531

[45] Date of Patent: Nov. 13, 1990

[54] THERMAL TRANSFER PRINTER

[75] Inventors: Horoshi Shimizu, Yokohama; Toshihiko Gotoh, Tokyo; Naohiro Ozaga, Yokohama; Takeshi Nomura, Yokohama; Kentaro Hanma, Yokohama; Mikio Shiraishi, Yokohama, all of Japan

[73] Assignee: Hitachi, Ltd., Tokyo, Japan

[21] Appl. No.: 155,810

[22] Filed: Feb. 16, 1988

[30] Foreign Application Priority Data

| | | | |
|---|---|---|---|
| Feb. 13, 1987 | [JP] | Japan | 62-29614 |
| Feb. 13, 1987 | [JP] | Japan | 62-29611 |
| Apr. 8, 1987 | [JP] | Japan | 62-84724 |

[51] Int. Cl.[5] ........................ G01D 15/10; G06K 7/12; B65H 16/00; B41J 35/28

[52] U.S. Cl. ............................... 346/76 DH; 235/469; 235/494; 242/57; 400/208; 400/249; 354/217

[58] Field of Search .................... 346/76 PH; 400/249, 400/225, 208; 242/57, 67.3 R, 71.1, 71.2, 377; 354/21, 217, 275; 235/469, 454

[56] References Cited

U.S. PATENT DOCUMENTS

| | | | |
|---|---|---|---|
| 4,151,403 | 4/1979 | Woolston | 235/92 DN X |
| 4,159,572 | 7/1979 | Nunes | 33/142 X |
| 4,408,212 | 10/1983 | Moriguchi et al. | 346/76 PH |
| 4,500,183 | 2/1985 | Tanikawa | 354/21 |
| 4,661,703 | 4/1987 | Ishikawa et al. | 250/317.1 |
| 4,747,716 | 5/1988 | van der Eikel | 400/249 |

*Primary Examiner*—Bruce A. Reynolds
*Assistant Examiner*—Gerald E. Preston
*Attorney, Agent, or Firm*—Antonelli, Terry, Stout & Kraus

[57] ABSTRACT

A thermal transfer printer includes a mark disposed on an ink spool of an ink film cassette, reading device for reading the rotation of the ink spool by use of the mark, a calculation device for calculating the used quantity of ink film by use of the rotation data of the spool, and a display portion for displaying the remaining quantity of ink film obtained by the calculation device.

5 Claims, 13 Drawing Sheets

THERMAL TRANSFER PRINTER

BACKGROUND OF THE INVENTION

1. Field of the Invention

This invention relates to a thermal transfer printer using a cassette with a built-in rolled medium such as an ink film.

2. Description of the Prior Art

Loading of an ink film into a printer for printing characters or images has conventionally been put into practical use in a large number of printers and typewriters. As a method of easily loading ink film having a particularly large width are known, such as one disclosed in Japanese Patent Laid-Open No. 67278/1981. This method fits a supply spool for supplying an ink film and a take-up spool for taking up the ink film into the same cassette which connects a plate roller for superposing receiver paper with the ink film at the time of printing to the supply and take-up spools inside the cassette by means of a torque converter. Thus, the ink film is supplied in accordance with the printing operation.

However, the prior art technique described above is not free from problems. For example when an ink film for a plurality of sheets is wound on a spool, it is not possible to determine the status of the ink film, particularly when the ink film cassette is removed from the printer. The remaining quantity of ink film is not recorded and the user of the printer cannot determine the remaining quantity of inked film especially when a plurality of, or a plurality of kinds of, ink film cassettes are used.

SUMMARY OF THE INVENTION

It is therefore an object of the present invention to confirm the remaining quantity of ink film in the cassette unit through observation both visually and through measurement by the printer while minimizing modifications of the cassette.

The object of the invention described above can be accomplished by disposing a mark for transferring the rotation quantity of an ink spool of an ink film cassette to a printer, and providing the printer with read means for reading the rotation of the spool by use of the mark, calculation means for calculating the quantity of ink film from rotation information of the spool and display means for displaying the remaining number of sheets of ink film obtained by the calculation.

An ink film cassette loaded into a printer supplies an ink film wound on an ink film supply spool inside the cassette to the printer in accordance with the printing speed of the printer and the used ink film is taken up on a take-up spool inside the cassette. As the inked film is used, the remaining quantity of the new ink film wound on the supply spool becomes smaller and along therewith, the diameter of roll of the supply spool and its outer peripheral length become smaller. If the length of the ink film to be used for one printing operation is constant, the number of revolution of the supply spool for one printing operation is small when the quantity of the new ink is sufficiently great or when the diameter of roll of the supply spool is great, and the number of revolution is great when the quantity of the new ink is small and the diameter of roll of the supply spool is small. The mark disposed on the spool consists of a black-and-white optical pattern or the like which generates pulses with the rotation of the spool and a predetermined number of pulses are generated once the spool rotates. Detection means for detecting the pulses generated by the mark disposed on the spool is provided to the printer and the total number of pulses thus detected is counted from the start of printing till its end. Since the number of revolutions of the spool differs with the remaining quantity of ink film, the remaining number of sheets of ink film is calculated by calculation means from the counted pulse number from the start till end of printing, and is displayed by display means. The operation described above is carried out whenever at least one printing operation is effected and confirmation of the remaining number of sheets of ink films in the ink film cassette is judged by comparing the diameters of roll of the supply and take-up spools by observing them through a window bored on the cassette.

DESCRIPTION OF THE PREFERRED EMBODIMENTS

Hereinafter, thermal transfer printers in accordance with some preferred embodiments of the present invention will be described with reference to the accompanying drawings.

Figure 1:
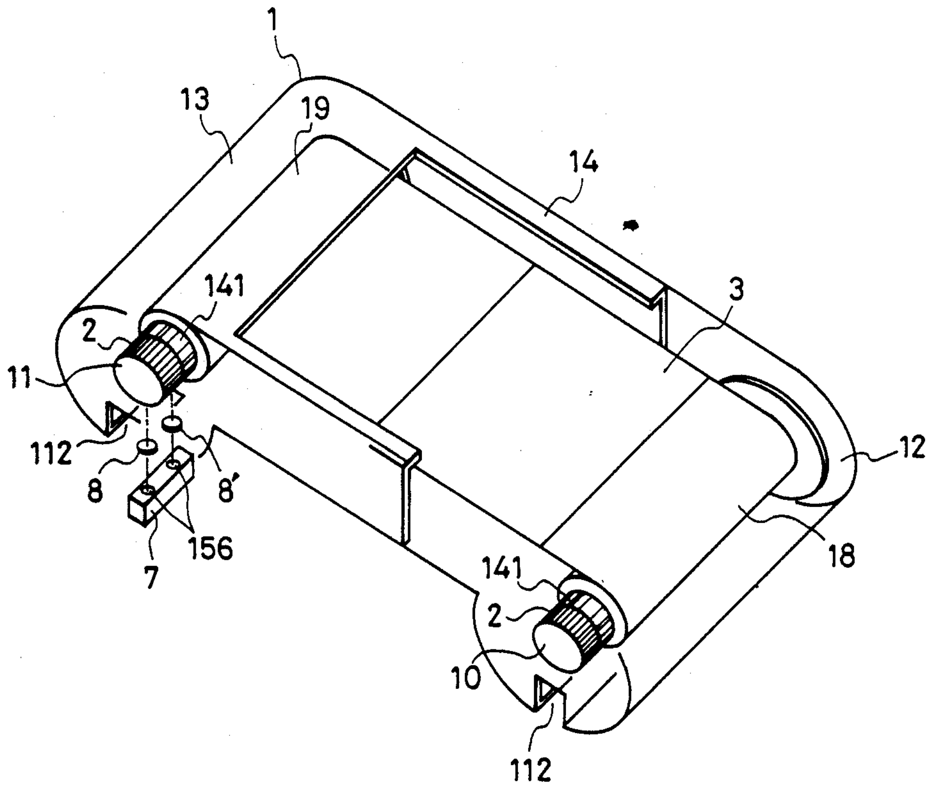
FIG. 1 is a structural view of a cassette in accordance with the present invention.

FIG. 1 shows an example of the cassette structure of the thermal transfer printer in accordance with one embodiment of the present invention. The cassette 1 includes a supply spool case 12 and a take-up spool case 13 connected and integrated with each other by a connecting portion 14. A supply spool 10 on which new ink film 18 is wound is loaded to the supply spool case 12 while a take-up spool 11 on which used ink film 19 is taken up is loaded to the take-up spool case 13. The ink film 3 is spread between the supply spool case 12 and the take-up spool case 13 along the connecting portion 14. Three color thermal transfer inks of yellow, Magenta and cyan are each coated on the ink film 3 in a size corresponding to one picture surface. Thermal transfer recording systems will be described in detail elsewhere. To effect printing, the ink film 3 is pulled out from the supply spool 10 and in order to take up the used ink film 19 by the take-up spool 11, both the supply and take-up spools 10 and 11 rotate with the printing operation. In this case, the diameter of the roll on the supply spool 10 becomes smaller with the use of the ink film 3 while the diameter of the roll on the take-up spool 11 becomes greater. Accordingly, if the quantity of use of the ink film 3 necessary for one printing operation is constant, the number of revolutions of the supply and take-up spools 10 and 11 per printing operation are not constant due to the change in the diameters of the rolls, but assume inherent values corresponding to the number of used sheets of the ink film 3 or the number of the remaining sheets. An FG pattern 2 for detecting the rotation is disposed at part of each of the supply and take-up spools 10, 11, and the number of revolutions of each of these spools is detected by later-appearing detection means from this FG pattern 2 in order to count the number of used sheets or remaining quantity of the ink film 3.

The operation described above occurs at the stage where the cassette 1 is loaded to the printer 4 and the printing operation is carried out. Previously, to determine the number of used sheets or the remaining quantity in the cassette 1, the diameter of roll of the ink film 3 was judged visually through a window 112 formed on the cassette 1. In this case, windows 112 are formed on both the supply spool case 12 and the take-up spool case 13 so as to allow one to compare the diameter of roll 18 the new ink with that of the used ink roll 19. For example, if the total number of sheets of ink film 3 is 100 and if the diameters of the new and used ink rolls 18, 19 are substantially equal to each other, the remaining quantity is about 50 sheets. If the diameter of the new ink roll 18 is about 1/10 of that of the used ink roll 19, the remaining quantity is about 10 sheets. Since the ink film 3 is generally made of a material having a low reflection factor such as black, it is not easy to judge the diameter of the ink film roll when observation is made through the small window 112. Therefore, the FG pattern 2 consisting of black-and-white spots is printed or bonded around the outer periphery of the spool 9 and the ink film 3 is wound thereon in order to make observation of the roll diameter easy in this embodiment. When the FG pattern 2 is fitted to other places as will be described elsewhere, observability of the roll diameter is improved by painting the spool 9 white or making it with a white member. Though the FG pattern 2 is disposed on both the supply and take-up spools 10, 11 in this embodiment, it may be disposed only on the supply spool 10 or the take-up spool 11.

A recording pattern 141 is put around the outer periphery of each of the supply and take-up spools 10, 11 in parallel with the FG pattern 2 described above, and a white or black pattern corresponding to one bit of data is put for each black-and-white pattern of the FG pattern 2. These two kinds of patterns are read by an optical sensor 7. Two systems of read sensor windows 156 are formed on the optical sensor 7 and a focal point is formed on the recording pattern 141 and on the FG pattern 2 by limiting their apertures by a lens 8. The optical sensor 7 reads simultaneously both the recording pattern 141 and the FG pattern 2 and sends the data to decoding means, not shown. The decoder, not shown, converts the data to a bit train representing ink film data by a later-appearing method.

Figure 2:
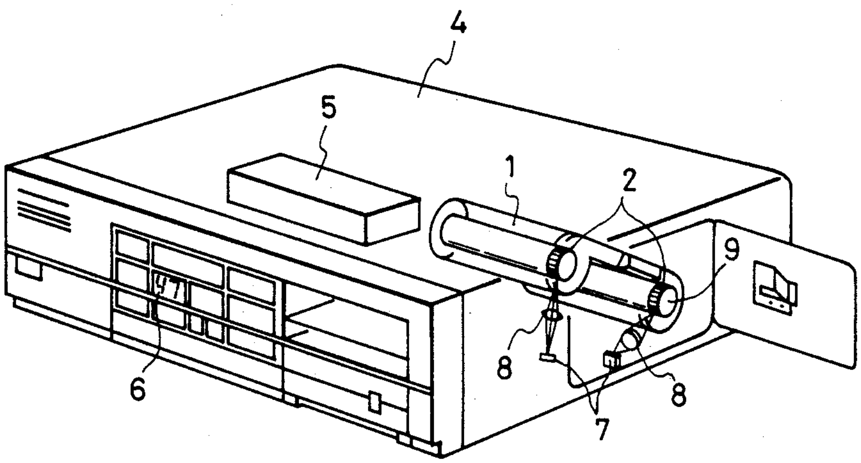
FIG. 2 is a structural view of a thermal transfer printer in accordance with the present invention.

FIG. 2 shows a structural example of the thermal transfer printer in accordance with the present invention. Printing is made by loading the cassette 1 into the printer 4. The thermal transfer recording system will be described later. The spool 9 rotates with the use of the ink film 3 inside the cassette 1. The optical sensor 7 reads the movement of the FG pattern 2 bonded to the spool 9 through the lens 8. A calculator 5 counts the number of revolutions of the spool 9 during one printing operation, calculates the number of used sheets or remaining sheets of the ink film 3 inside the cassette 1 from the result of counting and displays the number on a display unit 6. The print color mode is switched on the basis of data read from the ink film 3. It is assumed in this embodiment that the light source for illuminating the FG pattern 2 is in the optical sensor 7. However, it is possible to employ the construction in which the optical sensor 7 has only the sensor unit and the light source is disposed adjacent to the optical sensor 7 or at another position where it can illuminate the FG pattern 2.

Figure 3:
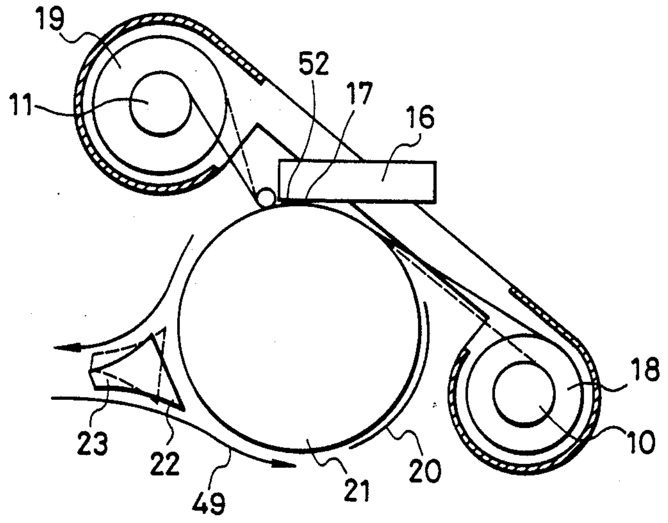
FIG. 3 is an explanatory view of the thermal transfer printer.

FIG. 3 shows one example of the print mechanism portion of the printer 4. At the start of printing, a feed/discharge switch member is in the state represented by reference numeral 22 and the receiver paper 20 is inserted in a direction represented by arrow 49 and wound on a drum 21. The ink film 3 is superposed on the receiver paper 21 on the drum 21 with the revolution of the drum 21 in the direction of arrow 49 and pressed by a thermal head 16 from above. Below the thermal head 16 are disposed 512 dots of heaters 17 in a direction parallel with the axis of the drum 21. The heaters 17 generate heat independently of one another in accordance with external signals. The ink of the ink film 3 is transferred to the receiver paper 20 in accordance with the heat quantity generated by the heaters 17. This operation is carried out 640 times while rotating the drum 21 in the direction of arrow 49 in predetermined intervals and a picture consisting of $512\times640$ pixels is printed on the receiver paper 20.

Thereafter, the receiver paper 20 is rotated with the drum 21 and superposed once again with the ink film 3 by the feed/discharge switch member 22. Three colors of inks, i.e., yellow, Magenta and cyan, are coated on the ink film 3 in the unit of one picture surface. Yellow, Magenta and cyan are thermally transferred in the order named by the method described above. Then, the feed/discharge switch member moves to the position 23 and the receiver paper 20 is discharged without being wound on the drum 21. As a result of the operation described above, the three colors of inks of $512\times640$ pixels are superposed on the receiver paper 20, thereby recording a color image.

The new ink 18 is wound on the supply spool 10, pulled out from the spool 10 with the use of the ink film 3 and passes below the heaters 17. After the ink is transferred to the receiver paper 20, the ink film 3 is taken up on the take-up spool 11 as the used ink film 19. As the ink film 3 is used, the supply spool 10 rotates and decreases the diameter of roll of the new ink 18. Using this decrease, the used quantity of the ink film 3 is measured. On the other hand, kind of the ink film 3 is judged by reading the recording pattern put on the spool during its revolution and then judging the kind on the basis of this data. The heat generation quantity of the heaters 17 disposed on the thermal head 16 is controlled on the basis of the kind of ink film 3 thus judged, and printing in a predetermined optical density is carried out irrespective of the kind of ink film 3.

Figure 4:
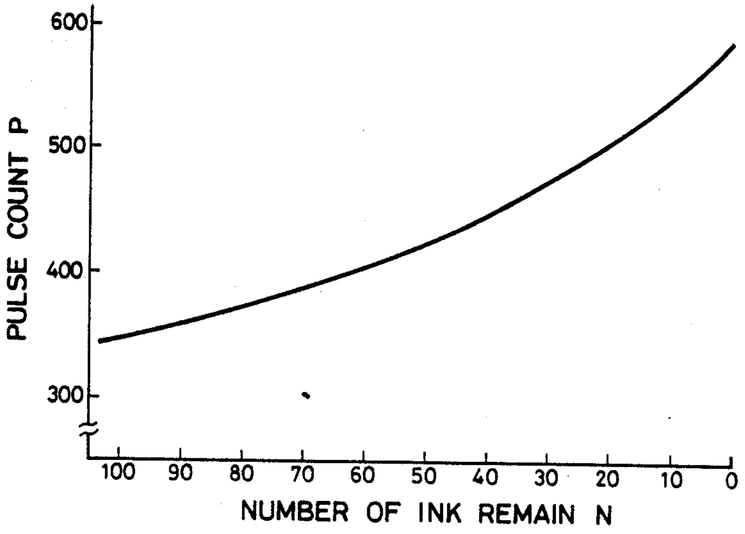
FIG. 4 is an explanatory view showing the relation between the ink remaining quantity of an ink film and the rotation quantity of a spool.

FIG. 4 is a diagram showing a typical relation between the number of revolution of the spool 9 and the remaining quantity of the ink film 3. When the ink film 3 having a thickness t is wound on the supply spool 10 having a diameter $D_o$ in a length l necessary for printing of one picture surface, the diameter of roll D is given as follows from the volume calculation of the ink film 3, that is, $l \cdot t \cdot N = \pi[(D/2)^2 - (D_o/2)^2]$:

$$D = 2\cdot[(D_o/2)^2 + l\cdot t\cdot N/\pi]^{\frac{1}{2}}$$

If the number of pulses generated by the FG pattern 2 while the supply spool 10 rotates once is p, the number of remaining sheets N of the ink film 3 and the number of revolutions of the spool 9 at the Nth printing operation, that is, the output pulse number P, are given by the following equation:

$$P = p\cdot l/(\pi\cdot D)$$

FIG. 4 shows the relation between N and P when p=50 pulses/turn, $D_o$=15 mm, l=560 mm and t=6 μm, for example. In other words, the output pulse number P assumes a value inherent to the number of remaining sheets N of the ink film 3 such as P=349 when N=100, P=350 when N=99, P=425 when N=50, P=58 when N=2 and P=589 when N=1. The number of remaining sheets of the ink film 3 at the time of printing can be determined by measuring this P value and referring to this diagram. The relation between N and P is non-linear. In this embodiment, the gradient of the curve is greater with the smaller number of remaining sheets of the ink film 3 so that resolution of detection can be improved. This results from the fact that the diameter of roll of the ink film 3 becomes small near the end of its use because the FG pattern 2 is fitted to the supply spool 10. When the FG pattern 2 of the take-up spool 11 is used, for example, resolution reaches the highest level at the start of use of the ink film 3. When the printer 4 is used in practice, it is preferred that the accurate number of remaining sheets of the ink film 3 be displayed when the number of remaining sheets becomes smaller; hence, the FG pattern 2 is preferably fitted to the supply spool 10. When it is necessary to display the accurate number from the start of use of the ink film 3, however, it is possible to dispose the FG pattern 2 on the take-up spool 11 too and to use the two FG patterns 2 conjunctively.

Figure 5:
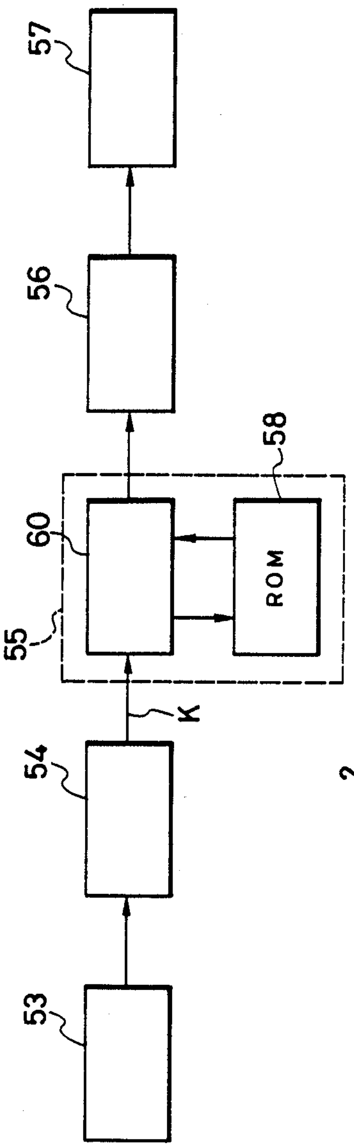
FIG. 5 is a block diagram of measurement of the number of remaining sheets of ink films.

FIG. 5 is a block diagram showing the operation of the counter for counting the number of remaining sheets of the ink film 3 in accordance with the present invention. The rotation quantity of the spool 9 is detected by detection means 53 such as the optical sensor 7, or the like, by 50 pulse signals per turn of the spool 9, for example. The counting circuit 54 counts the detected pulses as the accumulated pulse number K from the start till end of the printing operation of the printer 4. Next, the accumulated pulse number K counted by the counting circuit 54 is inputted to a judgment circuit 55, and this judgment circuit 55 lets calculation means 60 count the number of remaining sheets of the ink film 3 by referring to a conversion table L prepared in advance in ROM 58. Here, the conversion table L can be prepared by use of the data table represented by the diagram of FIG. 4.

Next, the number of remaining sheets of the ink film 3 calculated by the judgment circuit 55 is sent to a display circuit 56. The display circuit 56 actuates display means 57 and displays the number of remaining sheets of the ink film 3 on the display means 57 which could be similar to such display unit 6 FIG. 2. Both the counting circuit 54 and the judgment circuit 55 are accomplished simultaneously by the calculation unit 5 such as a microcomputer in the embodiment shown in FIG. 2, but they can be accomplished individually by use of separate hardware. It is also possible to calculate the conversion table L from the data put to the recording pattern on the spool such as the thickness of the ink film 3 inside the cassette 1 and to write it into RAM 59 which is used in place of ROM 58.

Figure 6:
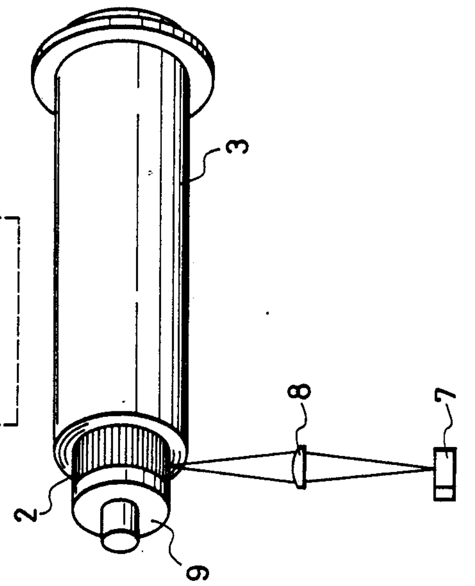
FIG. 6 is a structural view of read means for reading an FG pattern.

FIG. 6 shows an example of read means for reading the FG pattern 2. The FG pattern 2 is formed by directly printing the pattern on the spool 9 or printing it on a seal and bonding the seal. As the spool 9 rotates, the white-and-black pattern of the FG pattern 2 alternately rotates. The rotation of the spool 9 is detected as pulses by observing this pattern by the optical sensor 7 through the lens 8. The number of pulses is counted from the start till end of printing, that is, for the period in which the ink film 3 travels in the distance corresponding to one picture surface. In this manner, the number of revolutions at the time of printing of one sheet is detected. Incidentally, when the aperture of the optical sensor 7 is great or when it is necessary to secure a sufficiently large distance between the FG pattern 2 and the optical sensor 7, focusing is made by use of the lens 8 as in this embodiment, but when the aperture of the optical sensor 7 is small or when the lens 8 is built in the optical sensor 7, the lens 8 need not exist. In any case, when detection is made by use of optical means as in the present embodiment, the detection means can be disposed in the non-contact arrangement with respect to the spool 9. Incidentally, illumination of the FG pattern 2 may be made by the light source which is built in the optical sensor, but the light source may be disposed adjacent to the optical sensor, or at another position where it can illuminate the FG pattern 2.

Figure 7A:
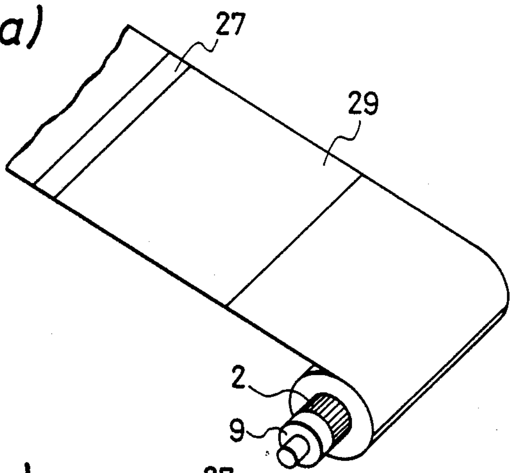
FIGS. 7(*a–b*) and 8 are perspective views showing the relation between the kind of the ink film and the FG pattern.
Figure 7B:
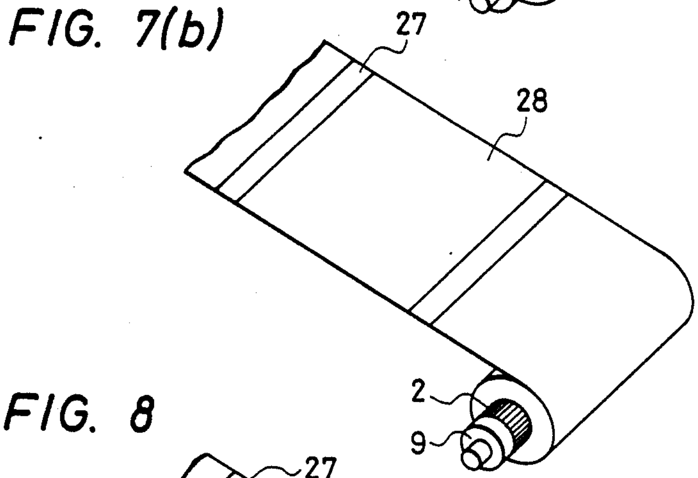

FIG. 7 shows one example of the combination of the kind of the ink film 3 with the FG pattern 2. In FIG. 7(*a*), the color inks 29 for the three colors are coated in the size of one picture surface for three continuous picture surfaces. If the pattern number of the FG pattern 2 per turn of the spool is 50 in this case, signals of 349 pulses and 425 pulses are generated when the number of remaining sheets of the ink film 3 is 100 and 50, respectively, as has already been described with reference to FIG. 4. FIG. 7(*b*) shows the case where the kind of ink film 3 is the black-and-white ink 28. Since the black-and-white ink 28 uses one picture surface of the ink film 3 per printing, the length of use of the ink film 3 is ⅓ of the color ink 29 and the number of revolution of the spool 9 at this time is ⅓ per printing of one sheet. If the pattern number of the FG pattern 2 per turn of the spool is made thrice to 150 pulses, the number of pulses generated per printing is the same as that of the color ink 29 and the number of the used ink films 3 can be calculated in the same way as above. In other words, it is not dependent on the kind and length of use of the ink film 3.

Figure 8:
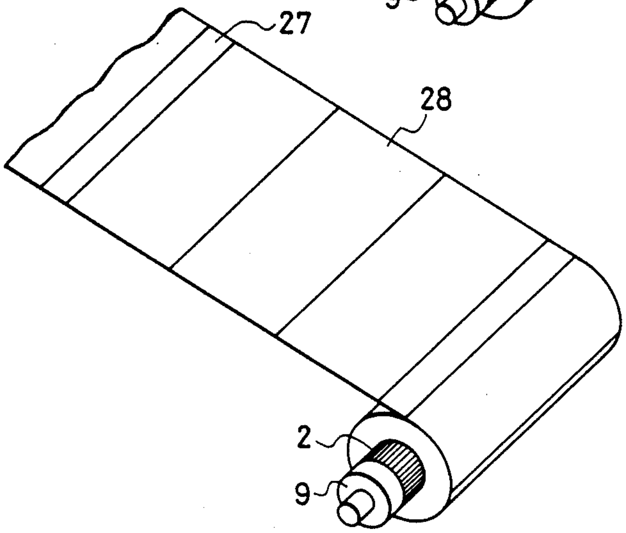

FIG. 8 shows an example where the ink film 3 is a half size color ink 30. In the case of the half color ink 30 whose one picture surface size is half that of the ordinary picture surface, the length of the ink film used for printing one picture surface is ½ of the ordinary case and the number of revolutions of the spool 9 becomes ½, too. However, if the pattern number of the FG pattern 2 is doubled to 100 pulses, the number of pulses generated per printing is the same as that of the ordinary color ink 29 and the number of used ink films 3 can be counted in the same way as described above. In other words, it does not depend on the kind and length of use of the ink film 3.

Figure 9:
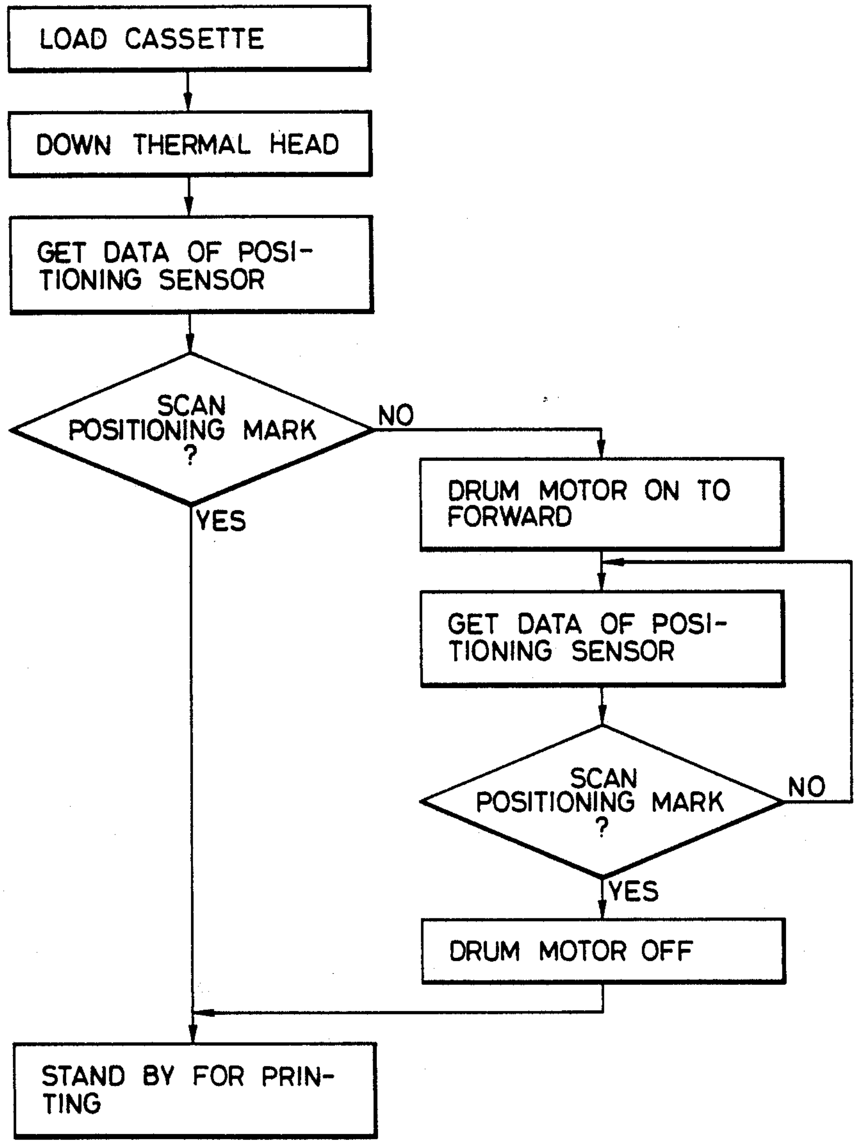
FIG. 9 is a flowchart showing an example of a thermal transfer printer operation for positioning the ink film.
Figure 10A:
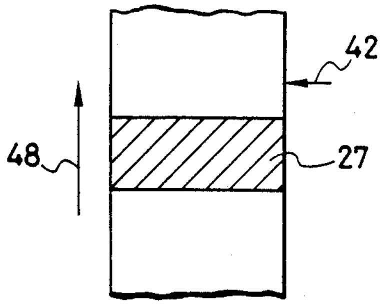
FIGS. 10(*a–c*) 11(*a–d*) and 12(*a–d*) are explanatory views showing the positioning state of the ink film and examples of the counting range of FG.
Figure 10B:
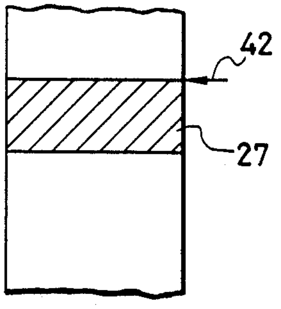
Figure 10C:
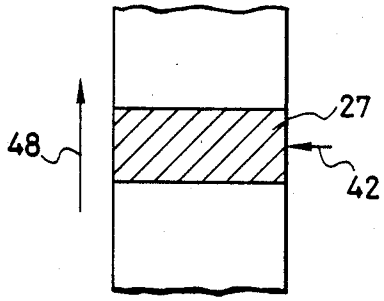
Figure 10D:
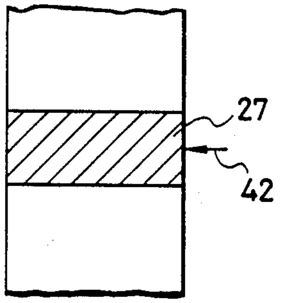
Figure 10E:
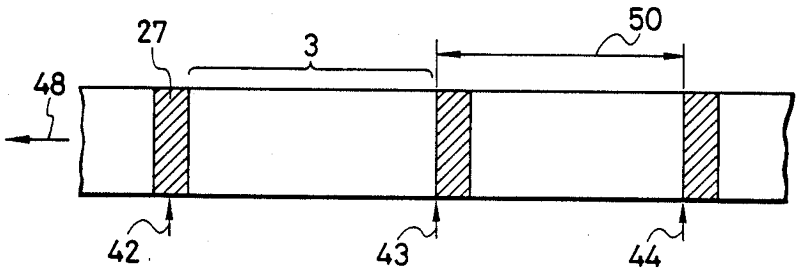

FIG. 9 shows an operation flowchart of the printer 4 which locates and positions the ink film 3. In FIG. 3, the thermal head 16 moves upward to a stand-by position at the time of loading of the cassette 1 to the printer 4 lest it impedes loading and unloading of the cassette 1. After the cassette 1 is loaded, a positioning sensor 52 fitted to the thermal head 16 is brought into close contact with the ink film. Next, the position of the ink film 3, that is, whether or not the positioning mark 27 is at the position of the positioning sensor 52, is examined by the positioning sensor 52. In FIG. 7, the positioning mark 27 is shown located at the position of the leading color of the ink film 3. If the positioning mark 27 is at the position of the positioning sensor 52, the printer 4 judges that the ink film 3 is at the correct position or in other words, the three color inks 29 after the positioning mark 27 are at the correct printing positions, and then enters the stand-by state for the start of the printing operation. If the positioning mark 27 is not the position of the positioning sensor 52, the drum 21 is rotated in the normal direction, that is, in the direction in which the ink film 3 is supplied from the supply spool 10 to the take-up spool 11. Simultaneously with turn-ON of the motor for rotating the drum 21, data input from the positioning sensor 52 is carried out until the positioning mark 27 reaches the position of the positioning sensor 52, and when it reaches the position of the latter, the rotation of the drum 21 is stopped and the printer enters the stand-by state described above.

FIG. 10 shows an example of timing for detecting the FG pattern 2 to detect the number of revolutions of the spool 9. Positioning mark 27 for positioning the ink film 3 for each picture surface is put to the ink film 3. It is a black belt having a predetermined width and the positioning sensor 52 of the printer 4 checks the leading part of this belt and makes positioning. FIG. 10(*a*) shows the state where positioning of the ink film is not made, and the positioning sensor 52 is at the position 42. Since the positioning sensor 52 does not detect the positioning mark 27, the printer moves the ink film 3 in the supplying direction of the ink film 3 from the supply spool 10 to the take-up spool 11 of the cassette 1, that is, in the forward direction. This direction is represented by the ink travelling in the direction of the arrow 48.

FIG. 10(*b*) shows the state where the positioning mark 27 is detected and the printer is standing by. The position 42 is at the leading part of the positioning mark 27. If detection of the FG pattern 2 is made from this position and continued until the positioning sensor again reaches the leading part of the next positioning mark 27 after completion of printing of one picture surface, the accurate number of sheets can be calculated. If the cassette 1 is exchanged during the operation, however, there occurs the case where the positioning mark 27 is ahead of the positioning sensor as shown by position 42 in FIG. 10(*c*). In this case, the positioning sensor 52 judges immediately that positioning of the ink film 3 is complete and stands by under the state shown in FIG. 10(*d*) without moving the ink film 3. If detection of the FG pattern is started from this state, the accurate number of sheets cannot be calculated because the length of use of the ink film is short. Accordingly, this embodiment divides the initial state of the ink film into the two cases (*b*) and (*d*) and calculation of the number of sheets is not made in the case (*d*). More definitely, a calculation of the number of sheets is not made when printing is started from position 42 shown in (*e*). The number of sheets is calculated in the printing operation from position 43 obtained by feeding the ink film 3 by the printer 4. Detection of the FG pattern 2 is made within FG measurement range 50 from the position 43 to position 44.

Figures 11A, 11B, 11C:
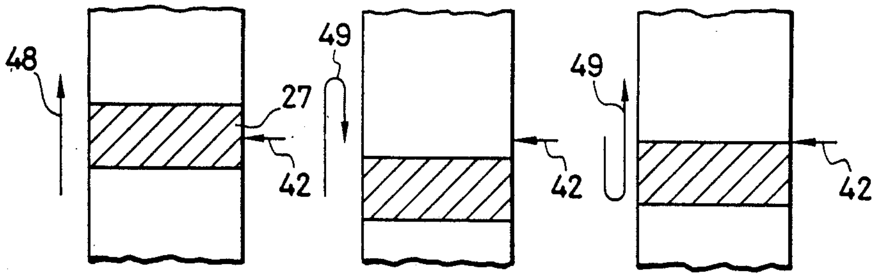
Figure 11D:
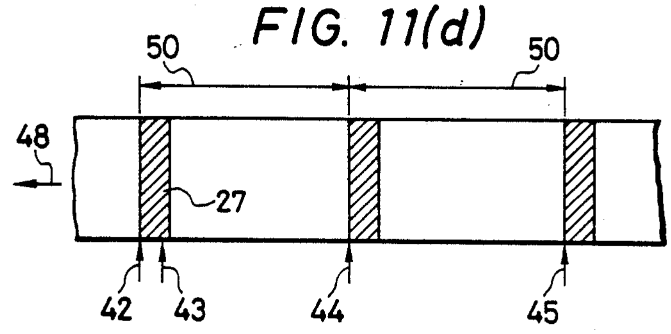

FIG. 11 shows other examples of detection of the FG pattern 2 in order to detect the number of revolutions of the spool 9. When the positioning sensor 52 has already detected the positioning mark 27 as shown in FIG. 11(*a*), that is, when the positioning sensor is inside the positioning mark 27, the ink film 3 is transferred from the take-up spool 11 to the supply spool 10 in this embodiment, that is, to the reverse direction, so that the positioning mark 27 comes back to position 42 as shown in (*b*). Next, the ink film 3 is sent in the normal direction so that the positioning mark 27 is at position 42 as shown in (6). Since the operation described above can always bring the ink film 3 to the suitable position, detection of the FG pattern 2 can be made by the same method.

More definitely, assuming that the positioning sensor 52 is at position 43 at the time of loading of the cassette 1 to the printer 4 as shown in FIG. 11(*d*), the ink film 3 is transferred to the reverse direction so as to bring the positioning mark 27 of the ink film 3 to position 42. The FG pattern 2 is detected from this state and when printing of one picture surface is completed or when position 44 is detected, the number of sheets is calculated. In the next printing operation, too, the suitable FG measurement range 50 can always be kept always because the range from positions 44 to 45 is detected. Accordingly, the number of remaining sheets of the ink film 3 can be detected correctly. According to this embodiment, however, it is necessary to apply power for rotating reversely the ink film 3 to the side of the supply spool 10 of the cassette which is equipped only with a brake for making the take-up torque constant, in those printer systems which feed the ink film 3 only in the normal direction. Therefore, this embodiment is suitable for the printer 4 for which provision of reverse rotation mechanism is necessary in conjunction with the film travelling path of the printer 4.

Figures 12A, 12B, 12C:
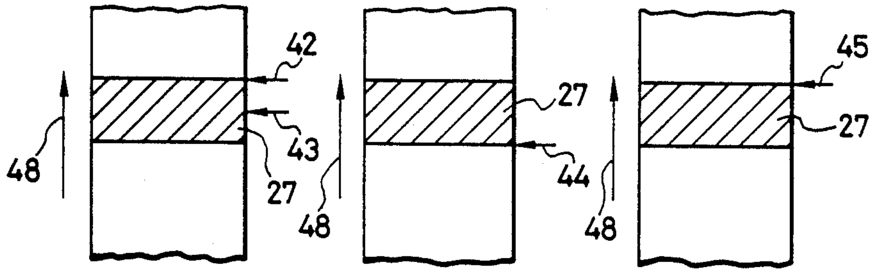
Figure 12D:
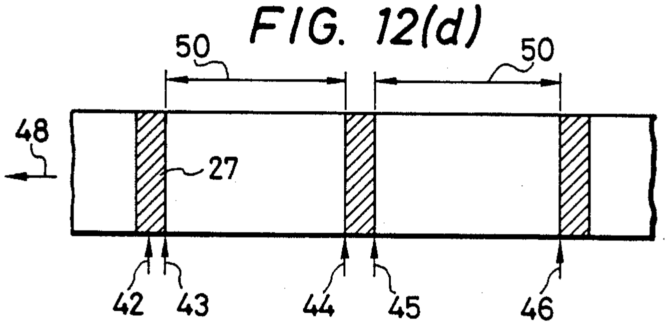

FIG. 12 shows another example of timing of detecting the FG pattern 2 in order to detect the number of revolutions of the spool 9. When the printer 4 is under the stand-by state shown in (*a*), the positioning sensor 52 is positioned at either position 42 or 43. After the start of printing, the ink film 3 is transferred in the normal direction and the trailing end of the positioning mark 27 passes by position 44 shown in (*b*). Detection of the FG pattern 2 is started from this state and continued until position 45 of (*c*) at the stand-by position after completion of printing of one picture surface. More definitely, printing is started from the position of the positioning sensor position 42 in (*d*) and the FG pattern 2 is detected between 45 and 46. According to the method described above, the FG measurement range 50 can be always kept between the trailing end of the positioning mark 27 to the leading part of the next positioning mark 27 and hence the number of sheets can always be counted correctly.

Figure 13A:
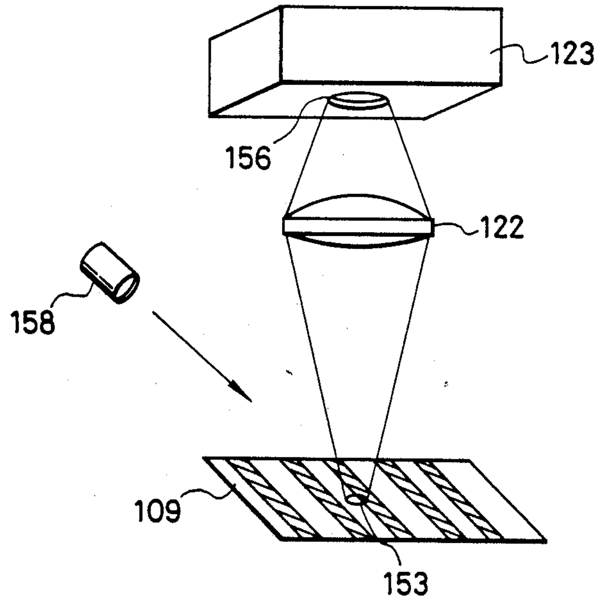
FIG. 13(*a–b*) an explanatory view showing an embodiment for limiting a sensor aperture.
Figure 13B:
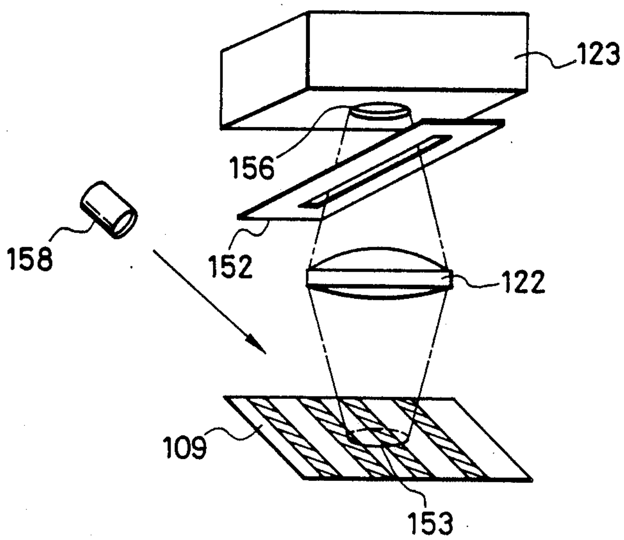

FIG. 13 shows an example of the optical system for reading the recording pattern 141 and the FG pattern 2 by reducing the aperture of the optical read sensor 123. If the spool diameter of each of the supply and take-up spools 10, 11 is 15 mm, for example, and if the recording pattern 141 and the FG pattern 2 are disposed by dividing the outer periphery of each spool into 50 segments, one black-and-white period interval of the pattern is about 1 mm and the black-and-white pattern width is about 0.5 mm. Therefore, the patterns cannot be read by ordinary sensors having an aperture of at least 2 mm and the aperture must be reduced by any means. FIG. 13(*a*) shows an example where the aperture is reduced by use of a lens 122. The lens 122 is disposed between the optical read sensor 123 and the recording unit 109. If the focal length of this lens 122 is selected suitably, it is possible eventually to reduce the sensing area 153 corresponding to a large sensor window 156 and to form the focus on the recording unit 109. In this case, the recording unit 109 is illuminated by disposing a light source 158. The small sensing area can be accomplished by use of the lens 122 even in the case of the optical read sensor having the large sensor window 156 and the recording unit 109 can make accurate reading and recording.

In FIG. 13(*b*), there is shown an example where the aperture is reduced by use of a slit. The image of the pattern on the recording unit 109 is formed on the sensor window 156 by use of the lens 122 in the same way as in (a), but the aperture is great and resolution is not so high as to read the patterns of the recording unit 109. In this embodiment, the slit 152 is positioned immediately before the sensor window 156 so as to reduce the aperture and to obtain an elongated focused area shown in the sensing range 153. In this manner, sufficient resolution to read the patterns on the recording unit 109 can be obtained.

Figure 14A:
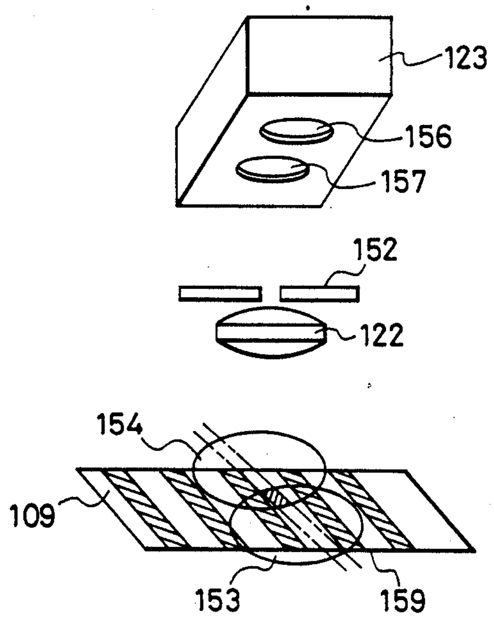
FIG. 14(*a–b*) is an explanatory view of a read optical system by a sensor with a built-in light source.
Figure 14B:
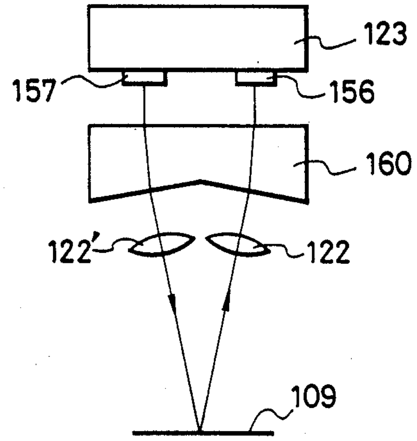

FIG. 14 shows an example which uses the optical read sensor with a built-in light source. A sensor window 156 and an opening 157 for emitting light or light source window are juxtaposed on the optical read sensor 123. The sensor window 156 and the light source window 157 are aligned in parallel with the pattern on the recording unit 109 and the aperture is reduced by use of the lens 122. Limiting of the aperture is not made by reduction unlike the example shown in FIG. 13, but is made so that the sensing area on the recording unit 109 overlaps with the illumination area. The aperture is further limited at the overlap portion between the sensing area and the illumination area by the slit 152 in order to obtain an aperture sufficiently small to read the pattern on the recording unit 109.

FIG. 14(*b*) shows an example where the center of the illumination area is brought into conformity with that of the sensing area by use of a prism 160. The rays of light leaving the light source window 157 are bent by the prism 160, pass through the lens 122' and form the focus on the recording unit 109. The rays of light leaving the recording unit 109 which is illuminated by the light source pass through the lens 122, are bent by the prism 160 and reach the sensor window 156. The centers of the light source window 157 and sensor window 156 which are disposed in the spaced-apart relation can be brought into conformity at the same point on the recording unit 109 by the prism 160.

Figure 15A:
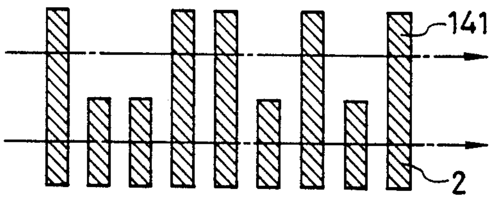
FIGS. 15 to 18(*a–b* respectively) are explanatory views showing examples of recording patterns and FG patterns and showing also sensor output waveforms.
Figure 15B:
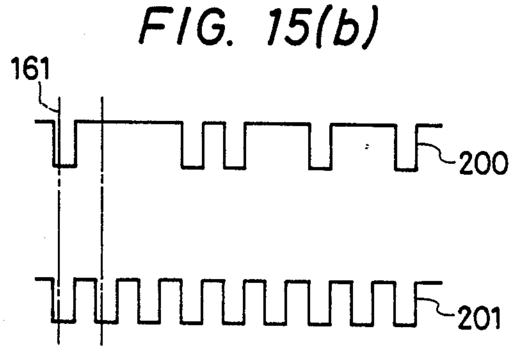

FIG. 15 shows an example of the definite shape of the recording pattern 141 and FG pattern 2 and an example of the sensor output signal. FIG. 15(*a*) is an enlarged view showing the example of each of the recording pattern 141 and FG pattern 2. The recording pattern 141 is put in synchronism with the black-and-white pattern of the FG pattern 2. FIG. 15(*b*) shows the sensor output waveform when these patterns are simultaneously read by two sensors. Since the signal waveform 200 is outputted in synchronism with the FG waveform 201, the recording pattern 141 is decoded by sampling the signal waveform 200 in each period of the FG waveform 201. More definitely, the signal waveform is sampled at the fall point of the FG waveform 201, that is, at a sampling point 161. According to this method, an accurate reading can be made even when the FG waveforms 201 are arranged equidistantly as in this diagram and the signal waveforms 200, which are in synchronism with the former, appear at any time.

Figure 16A:
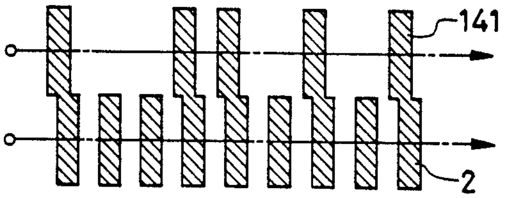
Figure 16B:
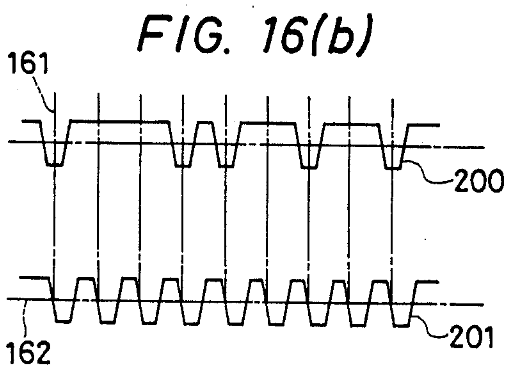

FIG. 16 shows another example of the definite shape of each of the recording pattern 141 and FG pattern 2 and shows an example of the sensor output signal. FIG. 16(*a*) is an enlarged view showing an example of the recording pattern 141 and the FG pattern 2. In comparison with FIG. 15, the phase of the recording pattern 141 is a little bit ahead of that of the FG pattern 2. FIG. 16(*b*) shows the output waveform of the sensor which reads the patterns described above. When sampling is made at a point where the FG waveform 201 is below a certain predetermined threshold 162, the data has already become definite at the sampling point 161 because the phase of the recording waveform 200 is ahead of that of the FG waveform 201 and the reading error is smaller. As a result, it is not necessary to use a delay circuit or the like for producing a time lag from the fall of the FG waveform 201 below the threshold 162 till actual sampling in order to accurately read the data, and to eventually reduce the cost of production.

Figure 17A:
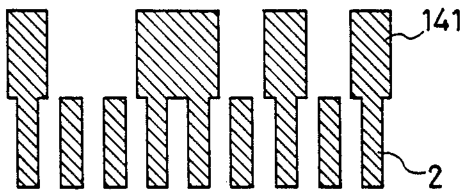
Figure 17B:
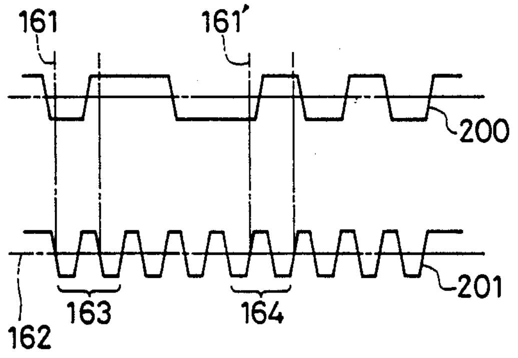

FIG. 17 shows an example of the definite shape of each of the recording pattern 141 and the FG pattern 2 and an example of the sensor output signal. FIG. 17(*a*) is an enlarged view showing an example of the recording pattern 141 and the FG pattern 2. The recording pattern 141 expands to the center between the adjacent FG patterns 2 and the recording pattern consists of large white and black blocks. FIG. 17(*b*) shows the output waveform of the sensor that has read the pattern. When the FG waveform 201 falls below a certain predetermined threshold 162, that is, at the portion of a fall sense 63, the recording signal waveform has already been determined at the sampling point 161 and an accurate reading can be made. On the other hand, when the FG waveform 201 rises above a certain predetermined threshold 162 that is, at the portion of a rise sense 164, the recording signal waveform has already been determined at the sampling point 161' and an accurate reading can be made.

In this embodiment, data sampling can be made accurately by using either the rise or fall of the FG signal 201. However, it is necessary to compensate for a phase difference by calculation by a microprocessor or the like in a data processing unit after reading the data because the phase of the recording data with respect to the FG signal 201 is delayed when it is read at the rise sense 164 as opposed to when it is read at the fall sense 163. In the case of this pattern, the same effect can be obtained when the pattern is read from right as when it is read from left. Accordingly, this system can be adapted to a printer having a different travelling direction of the reading mechanism.

Figure 18A:
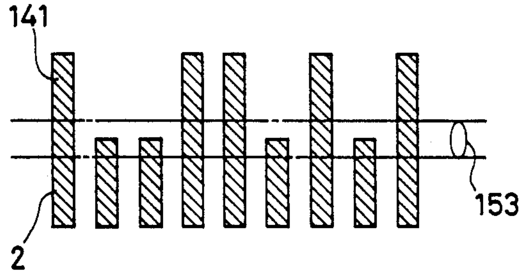
Figure 18B:
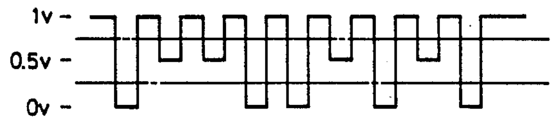

FIG. 18 shows an example where the recording pattern 141 and the FG pattern 2 are read simultaneously by one sensor. FIG. 18(*a*) shows the scanning orbit of the sense area for reading the recording pattern 141 and the FG pattern 2. The recording pattern 141 and the FG pattern 2 are read by the sense area 153 having a predetermined size so that the joint of these patterns 141, 2 embraces exactly the half each of the recording pattern 141 and the FG pattern 2. In this case, the optical read sensor outputs 1 V when the sense area 153 is fully white, 0.5 V when the sense area 153 is only the FG pattern 2 or when one half is white with the other bening black, and 0 V when the sense area 153 contains both the FG pattern 2 and the recording pattern 141, that is, when the full part is black, for example.

FIG. 18(*b*) shows the output waveform of the sensor. The output waveform takes three voltages, i.e. IV, 0.5 V and 0 V, and they represent the cases where the sense area 15 is totally white, where it is half white and half black and where it is totally black, respectively. The shift of the output from 1 V to 0.5 V or to 0 V presents the detection of fall of FG. When the output is 0.5 V, it represents that the recording signal is Hi and when the output is 0 V, it represents that the recording signal is Lo. In other words, the recording signal is read by reading this voltage change. More definitely, the threshold values are put at two positions, i.e., between 1 V and 0.5 V and between 0.5 V and 0 V of the output voltage, and the pass through each threshold voltage is detected.

Figure 19:
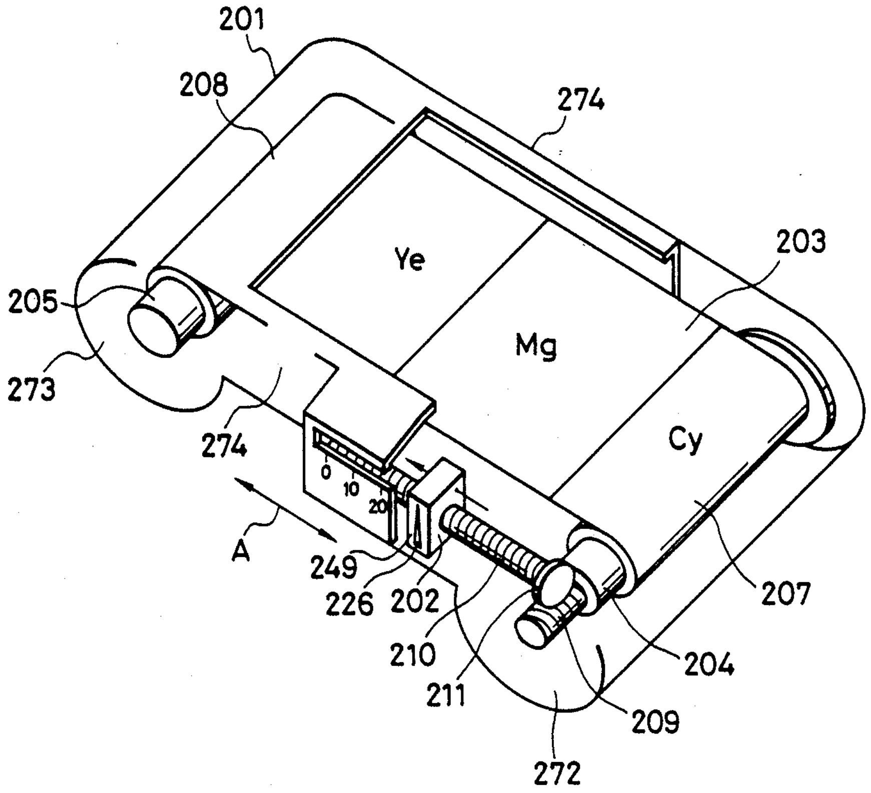
FIG. 19 is a perspective view of a sheet number counter disposed inside the cassette.

FIG. 19 shows an example of the mechanism of a sheet number counter 202 for measuring the number of revolutions of the spool 204 and displaying the number of remaining sheets of the ink film 203. The ink film 203 is wound on the spool 204, which rotates with the use of the ink film 203. The rotation of the spool 206 rotates in turn a worm gear 209 disposed coaxially with the spool 206 and the worm gear 209 rotates in turn a spur gear 211 and transmits the rotation of the spool 206 while reducing it. The rotation of the spur gear 211 is transmitted to another worm gear 210 and a feed screw 249 having an internal screw moves in accordance with the rotation of the worm gear 210. An indicator 226 is fitted to the feed screw 249 and indicates the number of remaining sheets of the ink film 203.

Figure 20:
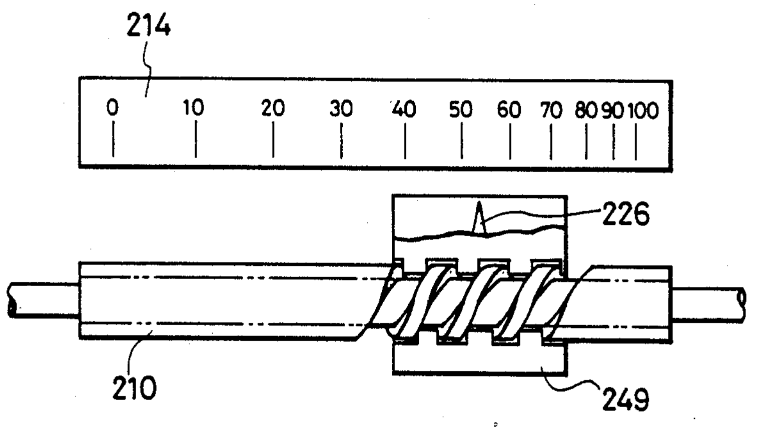
FIG. 20 is a perspective view showing an example of a remaining quantity display method of the sheet number counter inside the cassette.

FIG. 20 shows a structural example of the indicator 214 and the worm gear 210 of the embodiment shown in FIG. 19. The outer diameter of the spool 204 changes with the use of the ink film 203. When, for example, an approximately 6 μm thick ink film 203 is wound in a quantity corresponding to 560 mm (per picture surface) x 100 (picture surfaces) on the spool having an outer diameter of 15 mm, the maximum diameter of the spool 204 is about 25 mm. In other words, the outer diameter of the spool 204 changes within the range of from 15 mm to 25 mm between the start and end of use of the ink film 203 and the number of revolution of the spool 204 corresponding to the use of the ink film 203 per picture surface changes from 7 turns/picture surface to 12 turns/picture surface. The indicator representing the number of used ink films 203 has a non-linear construction if the worm gear 210 has a linear construction. If means for measuring the rotation of the spool 204 of the sheet number counter 214 is fitted to the take-up spool 205, its revolution is fast at the start of use of a new cassette because the diameter of the take-up spool 205 is small and the scale gap of the indicator is great. Since the diameter of the take-up spool 205 is great near the end of use of the cassette 1, the rotation speed is low and the scale gap is small. When using the ink film cassette, it is preferred that smaller scales be put near the end of use of the ink film 203. Though the used ink film 209 is taken up to the take-up spool 205, unevenness occurs on the ink film 203 due to heating of the ink film 203 by the thermal head as described already and the outer diameter of the take-up spool 205 becomes unstable. Accordingly, the relation between the number of revolutions of the take-up spool 205 and the quantity of used ink film becomes unstable, too, and the correct display of the number of sheets may not be made. For this reason, the sheet number counter 202 is preferably fitted to the supply spool 204.

In the above-mentioned case, since the new ink 207 is wound on the supply spool 204 at the start of the new cassette, the outer diameter of the supply spool 204 is great and its rotating speed is low so that the scale gaps of the indicator 214 are small. Near the end of use of the cassette, on the other hand, the outer diameter of the supply spool 204 becomes small and its rotating speed becomes high so that the scale gaps of the indicator 214 become great. As a result, the number of sheets can be confirmed with greater resolution near the end of use of the cassette. However, when no space for mounting the sheet number counter 202 is available on the side of the supply spool 204, where the cassette of the thermal transfer printer is disposed, the sheet number counter 202 may be disposed on the side of the take-up spool.

Figure 21:
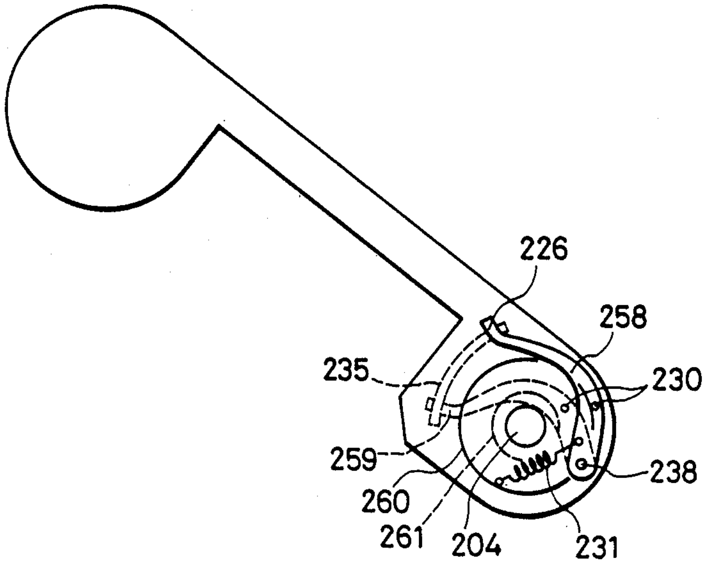
FIG. 21 is a perspective view showing an example of a method wherein the remaining counter inside the cassette directly measures the outer diameter of the spool and displays the remaining quantity.

FIG. 21 shows an example of means for measuring directly the outer diameter of the spool 204 and displaying the number of used ink films 203 or its remaining quantity. An outer diameter measuring arm 258 equipped with an outer diameter measuring member 230 for measuring the outer diameter of the spool 204 is rotatably fitted inside the cassette and is pushed into the spool 204 by a spring 231. In the state where the ink film 203 is wound sufficiently on the spool 204, that is, in the state of ink film 260, the outer diameter measuring arm is at the position 258. Next in the state where the ink film 203 is not wound much on the spool 204, that is, in the state of the ink film 261, the outer diameter measuring arm moves to the position 259, and the position of the indicator 226 moves in response to the former. The indicator 226 displays the number of used ink films 203 or its remaining quantity on the scale display window 235. In the embodiment described above, the change of the outer diameter of the spool 204 is about 5 mm. Therefore, if the distance ratio between the outer diameter measuring member 230 and the indicator 226 is set to form about 1:3 to about 1:4 with respect to the center of rotation 238 as shown in the drawing, the operative range of the indicator 226 is from 15 to 20 mm. In this manner, in the embodiment where the maximum diameter is about 25 mm, the diameter of the roll can be made substantially equal to the outer diameter of the spool case.

In accordance with the present invention, the remaining quantity of the ink film can be confirmed in the cassette unit even when the cassette is unloaded from the thermal transfer printer, and management of the remaining ink quantity can be made extremely easily. This effect can be obtained by an extremely economical method of printing or bonding the mark onto the spool of the cassette and forming the window on the cassette, with almost no adverse influence on the cost of production of the cassette. Accordingly, this method provides a great merit to the mass-production of the cassette which is a consumed item. The marker storing the data on the ink film and disposed on the cassette can be read economically and reliably without the need of any specific mechanical system such as constant speed scanning of a sensor or the like. Since the recording portion can be formed easily by bonding the seal that is prepared in advance by printing or the like onto the record fitting portion secured on the cassette, any drastic modification of molds for plastic resulting from the change of the data content is not necessary. Furthermore, since the recording portion is disposed at the position of the cassette to which access by hand is not easy or cannot be made, the possibility of destruction of the data content due to direct or stain is low. Since it becomes possible in accordance with the cassette of the present invention to directly measure the rotation of the spool and to display the remaining quantity of the ink film inside the ink film cassette, the remaining ink film quantity can be displayed in conventional thermal transfer printers.

What is claimed is:

1. An ink film cassette including a pair of ink spools having wound thereon an ink film produced by coating ink on a thin belt-like film or paper and fitted into a cassette case in an arrangement such that at least one of said ink spools can be connected in an axial direction to a torque supply shaft loaded into said cassette case from outside said cassette case, and said torque supply shaft can transmit in rotating force to said ink spools, the improvement comprising:

a first plurality of alternating color patterns disposed with predetermined gaps on a periphery of at least one of said ink spools for representing the rotating quantity of said ink spools;

a second plurality of alternating color patterns representing data on the kind of said ink film, which are disposed adjacent to said first plurality of alternating color patterns in an axial direction of said first plurality of alternating color patterns and are juxtaposed in a predetermined code in synchronism with said first plurality of alternating color patterns.

2. An ink film cassette according to claim 1, wherein the phase of said second plurality of alternating color patterns which represents the kind of said ink film is ahead of the phase of said first plurality of alternating color patterns with respect to the rotation of said ink spools.

3. A thermal transfer printer according to claim 1, wherein said first plurality of alternating color patterns represent a clock signal pattern alternating at a specified rate in connection with the rotating quantity of said at least one of said ink spools.

4. A thermal transfer printer for recording by superposing an ink film on receiver paper, said printer utilizing an ink film cassette including a pair of ink spools having wound thereon said ink film produced by coating ink on a thin belt-like film or paper and fitted into a cassette case in an arrangement such that at least one of said ink spools can be connected in an axial direction to a torque supply shaft loaded into said cassette case from outside said cassette case, and said torque supply shaft can transmit a rotating force to said ink spool, the improvement comprising:

a first plurality of alternating color patterns disposed on at least one of said ink spools and representing the rotating quantity of said ink spools;

a second plurality of alternating color patterns which are juxtaposed with said first plurality of alternating color patterns and representing data on the kind of said ink film, said second plurality of alternating color patterns being disposed in synchronism with said first plurality of alternating color patterns; and optical detection means located external to said cassette for detecting said first and second plurality of alternating color patterns.

5. A thermal transfer printer according to claim 4, wherein the phase of said second plurality of alternating color patterns which represents the kind of said ink film is ahead of that of said first plurality of alternating color patterns with respect to the rotation of said ink spool.

* * * * *